United States Patent
Nguyen et al.

(10) Patent No.: US 6,465,142 B1
(45) Date of Patent: Oct. 15, 2002

(54) LOW-TEMPERATURE CURE POLYVINYLBUTYRAL AS A PHOTOCONDUCTER BINDER

(75) Inventors: Khe C. Nguyen, Los Altos, CA (US); Sivapackia Ganapathiappan, Fremont, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 08/974,926

(22) Filed: Nov. 20, 1997

Related U.S. Application Data

(63) Continuation of application No. 08/641,449, filed on Apr. 30, 1996, now abandoned.

(51) Int. Cl.⁷ .............................................. G03G 15/02
(52) U.S. Cl. ..................... 430/58.8; 430/31; 430/58.05; 430/58.35; 430/58.75; 430/59.4; 430/59.5; 525/60; 525/61
(58) Field of Search ........................... 524/557; 430/59, 430/31, 58.05, 58.35, 58.75, 58.8, 59.4, 59.5; 525/61, 60

(56) References Cited

U.S. PATENT DOCUMENTS

| | | | |
|---|---|---|---|
| 2,689,844 A | | 9/1954 | Melamed ..................... 260/72 |
| 4,413,091 A | | 11/1983 | Iwasaki et al. ................ 525/61 |
| 4,514,482 A | * | 4/1985 | Loutfy et al. ................. 430/78 |
| 4,728,592 A | * | 3/1988 | Ohaku et al. ................. 430/59 |
| 4,830,944 A | * | 5/1989 | Umehara et al. ............. 430/59 |
| 4,882,254 A | * | 11/1989 | Loutfy et al. ................. 430/59 |
| 4,971,877 A | * | 11/1990 | Miyamoto et al. ............ 430/76 |
| 4,994,566 A | * | 2/1991 | Mimura et al. ............. 540/141 |
| 5,008,173 A | * | 4/1991 | Mimura et al. ............... 430/78 |
| 5,019,473 A | * | 5/1991 | Nguyen et al. ............... 430/58 |
| 5,055,368 A | * | 10/1991 | Nguyen et al. ............... 430/78 |
| 5,114,815 A | * | 5/1992 | Oda et al. ..................... 430/58 |
| 5,189,156 A | * | 2/1993 | Mayo et al. ................. 540/141 |
| 5,206,359 A | * | 4/1993 | Mayo et al. ................. 540/141 |
| 5,252,417 A | * | 10/1993 | Tokida et al. ................. 430/59 |
| 5,310,613 A | * | 5/1994 | Pai et al. ...................... 430/59 |
| 5,312,706 A | * | 5/1994 | Springett .................... 430/58 |
| 5,324,615 A | * | 6/1994 | Stegbauer et al. .......... 430/132 |
| 5,389,481 A | * | 2/1995 | Saita et al. ................... 430/59 |
| 5,412,041 A | | 5/1995 | Lesko et al. ................. 525/340 |
| 5,418,107 A | * | 5/1995 | Nealey et al. .............. 430/132 |
| 5,440,029 A | * | 8/1995 | Nukada et al. ............. 540/141 |
| 5,462,825 A | * | 10/1995 | Tanaka et al. ................ 430/58 |
| 5,512,674 A | * | 4/1996 | Nukada et al. ........... 430/78 X |
| 5,550,000 A | * | 8/1996 | Takegawa et al. .......... 430/131 |
| 5,571,647 A | * | 11/1996 | Mishra et al. ................ 430/58 |

FOREIGN PATENT DOCUMENTS

| | | |
|---|---|---|
| EP | 0219862 | 4/1987 |
| FR | 1296500 A | 5/1962 |

OTHER PUBLICATIONS

Ono et al., "Influence of Molecular Structure of Bisazo Pigments on Electrophotographic Characteristics of Layered Organic Photoreceptors", Proceedings, Sixth International Congress on Advances in Non–Impact Printing Technologies, Orlando, Florida, 1990, pp. 312–320.

Arita et al., "Near–Infrared Sensitive Electrophotographic Photoreceptors Using 1,4–dithioketo–3,6–diphenyl–pyrrolo–[3,4–c]–pyrrole—The Effect of Crystal Structures on the Electrophotographic Characteristics", Proceedings, Sixth International Congress on Advances in Non–Impact Printing Technologies, Orlando, Florida, 1990, pp. 321–326.

Miyazaki et al., "The Relation Between Crystal Forms and Electrophotographic Properties in Azo–Pigment and Titanylphthalocyanine", Proceedings, Sixth International Congress on Advances in Non–Impact Printing Technologies, Orlando, Florida, 1990, pp. 327–339.

Enokida et al., "Characteristcs of τ–Form Metal–Free Phthalocyanine and Its Improvement for Organic Photoreceptors", Proceedings, Sixth International Congress on Advances in Non–Impact Printing Technologies, Orlando, Florida, 1990, pp. 340–346.

* cited by examiner

Primary Examiner—Judy M. Reddick

(57) ABSTRACT

Poly(vinyl butyral) compounds of Formula 1

Formula (I)

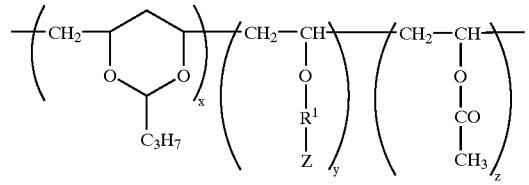

where $R^1$ is alkyl, dialkyl ether, alkyl carbonyl, cycloalkyl, cycloalkyl alkyl, aryl, aryl carbonyl, alkaryl carbonyl, aralkyl, or alkyl aralkyl;

Z is —OH or —$NHR^2$, where $R^2$ is independently alkyl, dialkyl ether, alkyl carbonyl, cycloalkyl, cycloalkyl alkyl, aryl, aryl carbonyl, alkaryl carbonyl, aralkyl, alkyl, aralkyl or $R^2$ is H.

x is 60 to 95 mol %, y is 3 to 40 mol %, z is 0 to 20 mol %; and x+y+z is 100 mol %, a process for preparing compounds of Formula I, an intermediate in the synthesis of compounds of Formula I, and a photoconductor for electrophotography containing a compound of Formula I as a binder in the charge generation layer are described. These compounds can be crosslinked in the absence of strong acidic and basic catalyst at relatively low temperatures compared with conventional polyvinyl butyral, show good adhesion to a wide variety of surfaces, and exhibit high photoresponses when used in charge generation layers of photoconductors.

12 Claims, No Drawings

LOW-TEMPERATURE CURE POLYVINYLBUTYRAL AS A PHOTOCONDUCTER BINDER

CROSS REFERENCE TO RELATED APPLICATION(S)

This is a continuation of application Ser. No. 08/641,449 filed on Apr. 30, 1996, now abandoned.

TECHNICAL FIELD

The present invention relates generally to polymeric binders used in photoconductors. More particularly, this invention relates to low temperature cure polyvinylbutyral and a process for its synthesis.

BACKGROUND OF THE INVENTION

Electrophotography is a process in which image information in the form of electronic signals is converted to optical signals which are then converted to a latent electrostatic field and stored until developed into a visible image and transferred to paper. Commercial applications of electrophotography include photocopiers and non-impact (i.e., electronic) printers. See, generally, J. Mort, *The Anatomy of Xerography* (McFarland & Co., 1989); J. L. Johnson, *Principles of Non Impact Printing* (Palatino Press, 1986).

The conversion of an optical image pattern to a latent electrostatic charge pattern is the function of the photoreceptor. The photoreceptor is a photoconductive insulator having charge generating and charge transport properties. In the process of electrophotography, the surface of the photoreceptor is charged with ions in the dark, then selectively discharged by exposure to an optical image. The degree of discharge is proportional to the light intensity in the optical image provided that the photogenerated charge carriers are efficiently transported away from the exposed surface (i.e., the required carrier mobility must be at least $10^{-6}$ cm$^2$/V second). The latent image thus produced is subsequently developed and fixed into a permanent image.

Many photoreceptors can be used both in photocopiers and in non impact printing. Although speed, spectral sensitivity and durability requirements differ for the two applications, the main requirements of a photoreceptor are: high photosensitivity to visible light, good carrier transport properties, and high dark resistivity. Uniform and low-cost manufacturing and the ability to tailor a photoreceptor's spectral responses to particular applications are also advantageous.

For these reasons, photoconductors comprised of dye molecules dispersed in an electrically inert cross-linked polymer are widely used commercially. Photoexcitation induces electronic transitions in dye molecules and initiates a cascade of intermolecular charge transport. The efficiency of this process, which involves the hopping of holes or electrons from one dye molecule to another, requires the presence of high concentrations of dye (circa $10^{20}$ molecules per cc) randomly dispersed in the polymer.

Various polymers have been used as pigment dispersing binders in charge generation layers, e.g., polyester, phenoxy resins, poly(vinyl acetate), and, most recently, poly(vinyl butyral) (see Proceedings, Sixth International Congress on Advances in Non-Impact Printing Technologies, Orlando, Fla., 1990, pp. 312–346). Poly(vinyl butyral) (PVB) is particularly preferred for its solubility in a wide range of solvents, its ability to coat many kinds of organic pigments thus providing stable dispersion throughout the charge generation layer, and its excellent film-forming properties. Conventional PVB has the structure,

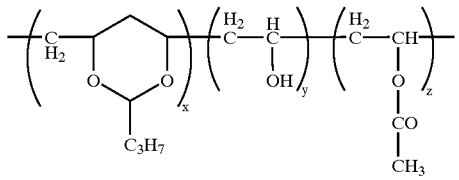

where x=60 to 95 mol %, y=3 to 40 mol %, and z=0 to 20 mol %, and x+y+z=100%.

The only reactive functional group for cross-linking the polymer is the hydroxy group of the polyvinyl alcohol component. Because of the relatively low reactivity of this group, elevated temperatures and long reaction times or strong acid or base catalysts are required. These conditions may adversely affect the performance of the photoreceptor by altering the stability of pigment and charge transport molecules contained therein. Accordingly, there is a need for poly(vinyl butyral) that can be cross-linked readily without resorting to harsh conditions of temperature and pH and, correspondingly, for a convenient and efficient method of synthesizing such a compound.

SUMMARY OF THE INVENTION

The invention provides new polymeric compounds which are useful as binders in photoconductors as well as in surface coating materials, structural adhesives, and other applications where low temperature cure may be advantageous or required.

Accordingly, one aspect of the invention is directed to compounds of Formula I:

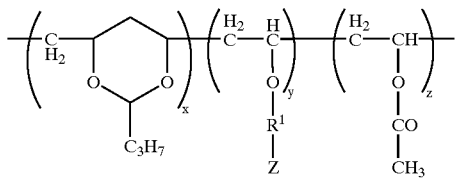

wherein:

$R^1$ is alkyl, dialkyl ether, alkyl carbonyl, cycloalkyl, cycloalkyl alkyl, aryl, aryl carbonyl, alkaryl carbonyl, aralkyl, or alkyl aralkyl;

Z is —OH or —NHR$^2$, where R$^2$ is independently alkyl, dialkyl ether, alkyl carbonyl, cycloalkyl, cycloalkyl alkyl, aryl, aryl carbonyl, alkaryl carbonyl, aralkyl, alkyl aralkyl, or R$^2$ is H.

x is 60 to 95 mol %, y is 3 to 40 mol %, z is 0 to 20 mol %; and x+y+z is 100 mol %.

Another aspect of the invention provides a process for preparing a compound of Formula I, where Z is —OH, by hydrolysing a compound of Formula (3) having the structure:

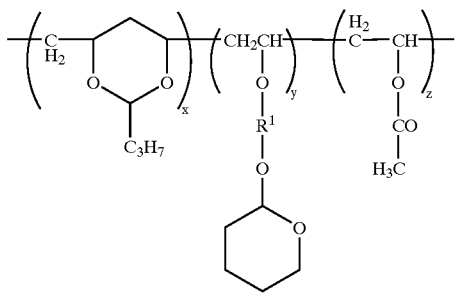

with an acid, where $R^1$, x, y, z are as defined above.

Yet another aspect of the invention is directed to an intermediate in the synthesis of a compound of Formula I, wherein the intermediate is a compound of Formula (3).

Another aspect of the invention is to provide a photoconductor for electrophotography, wherein the photoconductor comprises a charge generation layer and a charge transport layer, the charge generation layer is formed from a photoconductive pigment dispersed in a binder, and the binder is comprised of a poly(vinyl butyral) compound of Formula I.

DETAILED DESCRIPTION OF THE INVENTION

1. Definitions

The following definitions are set forth to illustrate and define the meaning and scope of the various terms used to describe the invention herein.

"t-BOC" means t-butoxycarbonyl.

"CGL" means charge generation layer.

"PVB" means poly(vinyl butyral).

As used herein, the term "alkyl" means a linear or branched chain mono- or di-valent radical consisting solely of carbon and hydrogen, containing no unsaturation and having from one to 10 carbon atoms, e.g., methyl, methylene, propyl, trimethylene, heptyl and the like, which can be optionally substituted with halogen or aryl groups.

As used herein, the term "dialkyl ether" refers to a mono- or di-valent radical of the formula —$R_a$—O—$R_b$, where $R_a$ and $R_b$ can be the same or different alkyl groups, and $R_b$ in a divalent radical forms a bond with Z of Formula I, e.g. diethyl ether, oxydiethylene, methoxyethylene, and the like.

As used herein, the term "alkyl carbonyl" refers to a mono- or di-valent radical of the formula —C(O)$R_a$ where $R_a$ is alkyl as defined above, and $R_a$ in a divalent radical forms a bond with Z of Formula I, e.g., methyl carbonyl, carbonyl ethylene, and the like.

As used herein, the term "cycloalkyl" refers to a mono- or di-valent ring radical consisting solely of carbon and hydrogen atoms, containing no unsaturation and having from five to seven carbon atoms, e.g,. cyclopentyl, cyclohexylene, and the like.

As used herein, the term "cycloalkyl alkyl" refers to a mono- or di-valent radical of the formula —$R_a$—$R_b$ where $R_a$ is alkyl and $R_b$ is cycloalkyl, and $R_b$ in a divalent radical forms a bond with Z of Formula I, e.g., cyclopentyl methylene, cyclohexylene ethylene, and the like.

As used herein, the term "aryl" refers to a mono- or di-valent unsaturated aromatic carbocyclic radical having one or more rings, e.g., phenyl, naphthyl, phenylene, and the like, which can be optionally substituted with halogen or aryl groups.

As used herein, the term "aryl carbonyl" refers to a mono- or di-valent radical of the formula —C(O)$R_c$ where $R_c$ is aryl, and $R_c$ in a divalent radical forms a bond with Z of Formula I, e.g., phenylcarbonyl, carbonyl phenylene, and the like.

As used herein, the term "alkaryl carbonyl" refers to a mono- or di-valent radical of the formula —$R_c$—$R_a$ where $R_c$ is aryl and $R_a$ is alkyl, and $R_a$ in a divalent radical forms a bond with Z of Formula I, e.g., methylphenyl carbonyl, methylene phenylcarbonyl, and the like.

As used herein, the term "aralkyl" refers to a mono- or di-valent radical of the formula —$R_a$—$R_c$ where $R_a$ is alkyl and $R_c$ is aryl, and $R_c$ in a divalent radical forms a bond with Z of Formula I, e.g., benzyl, methylene phenylene, and the like.

As used herein, the term "alkyl aralkyl" refers to a mono- or di-valent radical of the formula —$R_c$—$R_a$, where $R_c$ is aralkyl as defined above and $R_a$ is alkyl, and $R_a$ in a divalent radical forms a bond with Z of Formula I, e.g. methyl benzyl, methylene phenylethylene, and the like.

As used herein, the term "hydrogen halide scavenger" means a compound capable of removing hydrogen halide from a reaction mixture, e.g., potassium carbonate, sodium carbonate, potassium bicarbonate, sodium bicarbonate, triethylamine, tributylamine, N,N'-dialkylamine, and the like The term "hydrolyzing" or "hydrolysis" refers to the process of splitting a chemical bond by the addition of water; for example, hydrolysis of an ether gives an alcohol, hydrolysis of an alkyl ester gives an organic acid and an alcohol. Hydrolysis may be accomplished by treatment with an inorganic or organic acid, or by treatment with a base.

"Optional" or "optionally" means that the subsequently described event or circumstance may or may not occur, and that the description includes instances where said event or circumstance occurs and instances in which it does not.

2. Utility

The compounds of Formula I are useful as binders in photoconductors as well as in surface coating materials, structural adhesives, and other applications where low temperature cure may be advantageous or required. The compounds of Formula I exhibit excellent adhesion to a wide variety of surfaces. When used as pigment dispersing binders in charge generating layers of photoconductors, the compounds of Formula I exhibit higher photoresponses than do comparable CGLs comprising conventional PVB. Because of their ability to undergo cross-linking at lower temperatures than conventional PVB, these compounds can be used with charge transport molecules and pigments that are sensitive to degradation by high temperatures and/or acid catalysts that are typically used during cross-linking of conventional PVB. The conditions required for cross-linking the compounds of Formula I are safer, less costly and more environmentally favorable than are conditions required for cross-linking conventional PVB.

3. Preferred Embodiments

Preferred are the compounds of Formula I where Z is —OH and $R^1$ is alkyl, dialkyl ether, alkyl carbonyl, cycloalkyl, cycloalkyl alkyl, aryl carbonyl, alkaryl carbonyl, aralkyl, or alkyl aralkyl. Particularly preferred are those compounds where $R^1$ is —$CH_2$—, —$CH_2CH_2$—, —$CH_2CH_2OCH_2CH_2$—, —$C(O)CH_2$—, —$C(O)CH_2CH_2$—, and —$CH_2C_6H_{10}$, and x is about 78% to about 82 mol %, y is about 15% to about 17 mol % and z is about 1% to about 7 mol %.

Also preferred are the compounds of Formula I where Z is —$NHR^2$, where $R^2$ is alkyl, dialkyl ether, alkyl carbonyl, cycloalkyl, cycloalkyl alkyl, aryl, aryl carbonyl, alkaryl carbonyl, aralkyl, alkyl aralkyl, or $R^2$ is H, and $R^1$ is the same as for compounds of Formula I where Z is —OH. Particularly preferred are those compounds where $R^1$ is —$CH_2$—, —$CH_2CH_2$—, —$CH_2CH_2OCH_2CH_2$—, —C(O)

$CH_2$—, —$C(O)CH_2CH_2$—, and —$CH_2C_6H_{10}$—, $R^2$ is H, and x is about 78 mol % to about 82 mol %, y is about 15 mol % to about 17 mol % and z is about 1 mol % to about 7 mol %.

4. Synthesis of Compounds of Formula I

A. Synthetic Reaction Parameters

The terms "solvent", "inert organic solvent" or "inert solvent" mean a solvent inert under the conditions of the reaction being described in conjunction herewith (including, for example, benzene, dichloromethane, tetrahydrofuran, dimethylformamide, acetonitrile, and the like, but excluding alcoholic solvents such as methanol, ethanol, isopropanol, and the like). Unless specified to the contrary, the solvents used in the reactions of the present invention are inert organic solvents.

Unless specified to the contrary, the reactions described herein take place at atmospheric pressure within a temperature range from 10° C. to 100° C., preferably from 15° C. to 90° C.; most preferably from "room" or "ambient" temperature, e.g., 20° C., to 80° C. Further, unless otherwise specified, the reaction times and conditions are intended to be approximate, e.g., taking place at about atmospheric pressure within a temperature range of about 5° C. to about 100° C., preferably from about 15° C. to about 90° C., most preferably from about 20° C. to about 90° C. over a period of about 14 to about 30 hours. Parameters given in the Examples are intended to be specific, not approximate.

Isolation and purification of the compounds and intermediates described herein can be effected, if desired, by any suitable separation or purification procedure such as, for example, filtration, extraction, centrifugation, chromatography, or a combination of these procedures. Specific illustrations of suitable separation and isolation procedures can be had by reference to the examples hereinbelow. However, other equivalent separation or isolation procedures can, of course, also be used.

B. Preparation of Compounds of Formula (I), Where Z is —OH

The process for the preparation of the compounds of Formula I, where Z is —OH, is shown below in Reaction Scheme 1, in which the substituent group $R^1$ and x, y and z have the same meanings as described in the Summary of the Invention, unless otherwise specified.

Reaction Scheme 1

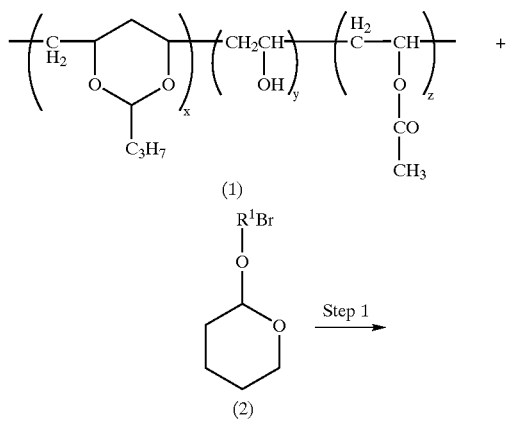

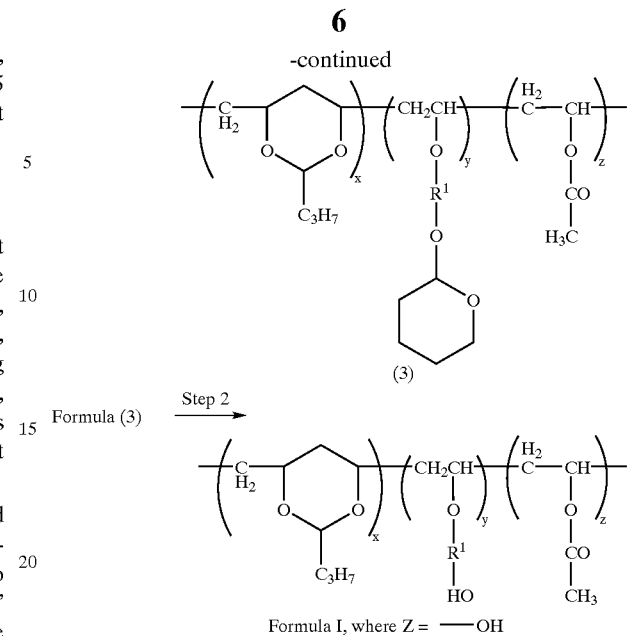

Formula I, where Z = —OH

Starting Materials

Polyvinyl butyral (PVB, Formula (1)), $R^1$Br-substituted alcohol and dihydropyran are commercially available. The tetrahydropyran compound of Formula (2) is formed by reacting $R^1$Br-substituted alcohol with dihydropyran by methods known in the art.

Formula (3)

As illustrated in Reaction Scheme 1, Step 1, PVB (1) is reacted with a compound of Formula (2) to give a corresponding compound of Formula (3).

The reaction is carried out in a nitrogen atmosphere in the presence of excess hydrogen halide scavenger, most preferably potassium carbonate. The reactants are heated in an inert organic solvent at about 70° C. to 90° C. to yield a compound of Formula (3). When the reaction is substantially complete, typically at 24 hours, the compound of Formula (3) is isolated from the reaction mixture by standard techniques, for example, by precipitation and filtration.

Formula (I), Z is —OH

As illustrated in Reaction Scheme 1, Step 2, the tetrahydropyran group is selectively removed from a compound of Formula (3) to yield the compound of Formula (I), where Z is —OH.

Selective removal of the tetrahydropyran group is achieved by dissolving the product of Step 1 in an inert solvent, adding to it dropwise a catalytic amount of a dilute acid, such as 10% HCl, and incubating the reaction mixture at room temperature until deprotection is complete, normally about 18 hours. The compound of Formula I is isolated from the reaction mixture, purified and concentrated by standard techniques, for example, by precipitation, and evaporation of volatile compounds under reduced pressure.

C. Preparation of Compounds of Formula (I), Where Z is —$NHR^2$

The process for the preparation of the compounds of Formula I, where Z is —$NHR^2$, is shown below in Reaction Scheme 2, in which the substituent group $R^2$ and x, y and z have the same meanings as described in the Summary of the Invention, unless otherwise specified.

Reaction Scheme 2

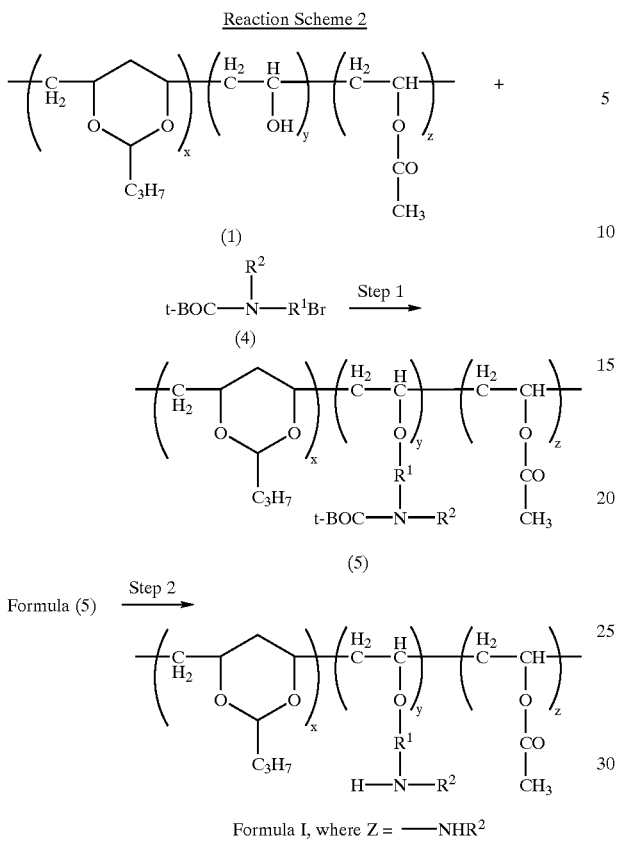

Formula (4)

Compounds of formula (4) are intermediates in the preparation of compounds of Formula I, Z=—NHR² as illustrated in Reaction Scheme 2. The compounds of Formula (4) are prepared by reacting brominated mono- or di-substituted amine or a corresponding salt thereof (commercially available) with di-t-butyldicarbonate according to methods known to those of ordinary skill in the art. Other amino protecting groups that can be removed easily with mild acids can also be used (e.g., amyl carbamate).

Formula (5)

A compound of Formula (5) is prepared by reacting PVB (Formula (1)) with a compound of Formula (4) in the presence of base using the same conditions as described for the preparation of Formula (3) above. When the reaction is substantially complete, the compound of Formula (5) is purified by precipitation.

Formula (I), Z is —NHR²

The amino-protecting group of a compound of Formula (5) is hydrolyzed in the presence of mild acid, e.g., trifluoroacetic acid, or alternatively, is removed by catalytic hydrogenation, to yield the compound of Formula I, where Z is —NHR².

EXAMPLES

The following preparations and examples are given to enable those skilled in the art to more clearly understand and to practice the present invention. They should not be considered as limiting the scope of the invention, but merely as being illustrative and representative thereof.

Example 1

1A. Formula (3) Where $R^1$ is Ethyl

A mixture of PVB (25 g; commercial PVB with x=80 mol %, y=16 mol % and z=4 mol %), tetrahydrofuran (TBF, 150 g), (2-bromoethoxy)-6-tetrahydropyran (12.95 g) and $K_2CO_3$ (42 g) under nitrogen was heated at 80° C. for 24 hours. The resulting mixture was diluted with TEF (200 g) and precipitated in water (7 L). The resultant precipitate was filtered to give in quantitative yield, poly(vinylbutyral-co-vinyl tetrahydropyranylethoxy ether-co-vinyl acetate):

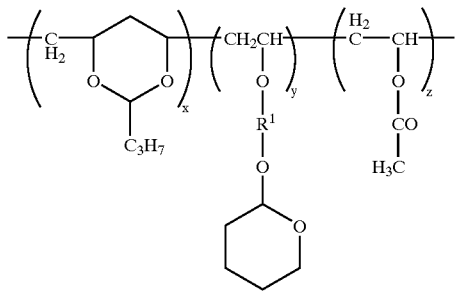

Formula (3), where $R^1$ is —$CH_2CH_2$—, x is 80 mol %, y is 16 mol % and z is 4 mol %

Solubility: soluble in THF, insoluble in IPA.

Proton NMR (60 MHz): integral intensity ratio (aliphatic/o-alkyl)=2.9; integral intensity ratio (aliphatic/o-alkyl) for PVB=3.23.

1B. Formula (3) Varying $R^1$

In a similar manner, but substituting 2-bromoethyoxy-6-tetrahydropyran with compounds of Formula (2) where $R^1$ is: —$CH_2$—, —$(CH_2)_2O(CH)_2$—, —$C(O)CH_2$—, —$C(O)CH_2CH_2$—, —$CH_2C_6H_{10}$—, —$C_5H_8$—, —$C(O)C_6H_4CH_2$—, —$C(O)C_6H_4CH(CH_3)$—, —$CH_2C_6H_4$— and —$CH_2C_6H_4CH_2$—, there are obtained the corresponding compounds of Formula (3).

Example 2

2A. Formula (I) Where $R^1$ is Ethyl and Z is OH

A mixture of TBF (265 g), 20 g of a compound of Formula (3), $R^1$=—$CH_2CH_2$—, and 17 ml water was carefully acidified by the addition of 10% aqueous HCl (0.62 g). The mixture was incubated at room temperature for 18 hours, then precipitated in 3.5 L of water. The precipitate was dissolved in isopropyl alcohol (157 g) and precipitated in 2 L heptane to give an 82% yield of the compound, poly(vinylbutyral-co-vinyl hydroxyethyl ether-co-vinyl acetate):

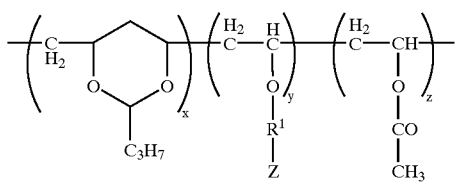

Formula I, where $R^1$ is —$CH_2CH_2$—, Z is OH, x is 80%, y is 16% and z is 4%

DSC: glass transition temperature (Tg) of the above compound of Formula I was determined to be 59° C.; Tg of PVB starting material was determined to be 66° C.

Solubility: soluble in IPA.

Proton NMR (60 MHz): integral intensity ratio (aliphatic/o-alkyl)=2.74.

2B. Formula I Varying $R^1$

In a similar manner, but substituting a compound of Formula (3), $R^1$=—$(CH_2)_2$—with compounds of Formula (3) where $R^1$ is: —$CH_2$—, —$(CH_2)_2O(CH_2)_2$—, —$C(O)$ $CH$—, —$C(O)CH_2CH_2$—, —$CH_2C_6H_{10}$—, —$C_5H_8$—, —$C(O)C_6H_4CH_2$—, —$C(O)C_6H_4CH(CH_3)$—, —$CH_2C_6H_4$— and —$CH_2C_6H_4CH_2$—, there are obtained the corresponding compounds of Formula I.

Example 3
Crosslinked CGL Containing a Compound of Formula I, $R^1$=—$CH_2CH_2$— and Z=—OH Thirty (30) grams of phenethyl perylene pigment ("Paliogene Black", BASF) and 10 g of modified poly(vinyl butyral) (Formula I, $R^1$=—$CH_2CH_2$—and Z=—OH) were milled together with 360 g methyl isobutyl ketone (MK) and zirconium beads (5 mm diameter) in a ceramic jar for 72 hours. The dispersion was adjusted with MIBK to contain 5% solid. Three (3) grams of poly diisocyanate NP-75 (70% solid in methyl ethyl ketone (MEK), Bayer) was added. After filtration through a 200 mesh filter, a sufficient amount of filtrate was coated onto Al mylar with a doctor blade to achieve a thickness of 1 micron after baking in an oven at 80° C. for 30 minutes, then at 135° C. for 2 hours to form the CGL.

Example 4
4A. Organic Photoconductor (OPC) Containing a Compound of Formula I, $R^1$=—$CH_2CH_2$— and Z=—OH and Phenethyl Perylene Pigment The CGL (Example 3) was coated with a solution containing 40 g of hole transport compound, N,N'-diphenyl-N, N'-bis(3-methylphenyl)-[1,1'-biphenyl]-4,4-diamine (purchased from Zeneca, U.K.), and 60 g of polycarbonate ("Makrolon" purchased from Mobay Chemical) dissolved in 900 g of dichloromethane (DCM) and 1,1,2-trichloroethane (TCE), 7:3 by weight, using a doctor blade to achieve a 25 micron thickness after baking at 110° C. for 2 hours.

The xerographic performance of OPC containing a compound of Formula I, $R^1$=—$CH_2CH_2$— and Z=—OH was compared with identically-prepared OPC containing conventional PVB, using an OPC tester (Cynthia 200). The sample was charged with negative corona voltage V=−6000V to measure the charge acceptance $V_o$(V), allowed to decay in the dark for 5 seconds in order to measure the dark decay DDR (V/s), and then exposed for 10 seconds to a wavelength of light strongly absorbed by the sample, in this case 630 nm, at a light intensity of 1 erg/cm². The photoresponse, $E_{1/2}$, was measured as the energy (ergs/cm²) required to discharge 80% of the surface charge from $V_o$(V). The residual voltage $V_r$(V) was detected as surface charge after being exposed to an eraser lamp. The results obtained are shown below. An OPC containing commercial PVB is referred to as "PVB", whereas an OPC containing a modified PVB of Formula I, $R^1$=—$CH_2CH_2$—, and Z=—OH is referred to as "PVB-M".

| Sample | Vo (V) | DDR (V/s) | $E_{1/2}$ | $V_r$ (V) | Adhesion |
|---|---|---|---|---|---|
| PVB | 730 | 2.5 | 5.2 | 17.0 | marginal |
| PVB-M | 725 | 3.2 | 1.6 | 13.0 | excellent |

4B. Organic Photoconductor (OPC) Containing a Compound of Formula I, $R^1$=—$CH_2CH_2$— and Z=—OH and Alpha Titanyl Phthalocyanine Pigment An organic photoconductor was prepared essentially as described in Example 4A with the exception that the CGL was formed from 20 g of alpha titanyl phthalocyanine and 10 g of PVB-M milled together with tetrahydrofuran (THF). The crosslinking step was omitted. For the results shown below, the photoresponse was measured at 780 nm. The same sample designations as used in Example 4A are used here.

| Sample | Vo (V) | DDR (V/s) | $E_{1/2}$ | $V_r$ (V) | Adhesion |
|---|---|---|---|---|---|
| PVB | 680 | 2.0 | 8.0 | 10.0 | poor |
| PVB-M | 650 | 2.3 | 4.0 | 5.0 | good |

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto. All patents and publications cited above are hereby incorporated by reference.

What is claimed is:

1. A photoconducter for electrography comprising:
   a charge generation layer formed from photoconductive pigment dispersed in a binder comprising a poly(vinyl butyral) compound of Formula I:

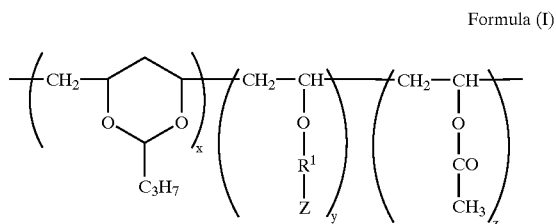

Formula (I)

wherein: $R^1$ is alkyl, dialkyl ether, alkyl carbonyl, cycloalkyl, cycloalkyl alkyl, aryl, aryl carbonyl, alkaryl carbonyl, aralkyl, or alkyl aralkyl; Z is —OH or —$NHR_2$, where $R_2$ is H, alkyl, dialkyl ether, alkyl carbonyl, cycloalkyl, cycloalkyl alkyl, aryl, aryl carbonyl, alkaryl carbonyl, aralkyl, alkyl, aralkyl; x is 60 to 95 mol %, y is 3 to 40 mol %, z is 0 to 20 mol %; and x+y+z is 100 mol %; and
   a charge transport layer.

2. The photoconductor of claim 1, wherein said photoconductive pigment is selected from the group consisting of titanyl phthalocyanine, vanadyl phthalocyanine, hydroxygallium phthalocyanine, metal-free phthalocyanine, copper phthalocyanine, aluminium phthalocyanine, chloroaluminium phthalocyanine and haloindium phthalocyanine.

3. The photoconductor of claim 1, wherein said photoconductive pigment is selected from the group consisting of tetracarboxiimide perylene pigments.

4. The photoconductor of claim 3 wherein said photoconductive pigment in said charge generation layer is phenethyl perylene.

5. The photoconductor of claim 1 wherein said charge transport layer comprises N,N'-diphenyl-N,N'-bis(3-methylphenyl)-[1,1-biphenyl]-4,4-diamine.

6. The photoconductor of claim 1, wherein said photoconductive pigment in said charge generation layer is titanyl phthalocyanine, and said charge transport layer comprises $(CH_3C_6H_4)_3N$.

7. The photoconducter of claim 1, wherein said binder comprises a poly(vinyl butyral) compound of Formula I, wherein Z is —OH and $R^1$ is —$CH_2CH_2$— or —$CH_2C_6H_{10}$—.

8. The photoconductor of claim 1, wherein x is 75 to 95 mol %, y is 3 to 12 mol %, and z is 15 to 20 mol %.

9. The photoconductor of claim 8, wherein:

$R^1$ is —$C_2$—, —$CH_2CH_2$—, —$CH_2CH_2OCH_2CH_2$—, —$C(O)CH_2$—, —$C(O)CH_2CH_2$—, or —$H_2C_6H_{10}$—.

10. The photoconductor of claim 9, wherein $R^1$ is —$CH_2CH_2$— or —$CH_2C_6H_{10}$—.

11. The photoconductor of claim 1, wherein x is 78 to 82 mol %, y is 15 to 17 mol %, and z is 1 to 7 mol %.

12. The photoconductor of claim 11, wherein x is 80 mol %, y is 16 mol %, and z is 4 mol %.

\* \* \* \* \*

UNITED STATES PATENT AND TRADEMARK OFFICE
CERTIFICATE OF CORRECTION

PATENT NO.   : 6,465,142 B1                                                Page 1 of 1
DATED        : October 15, 2002
INVENTOR(S)  : Nguyen et al.

It is certified that error appears in the above-identified patent and that said Letters Patent is hereby corrected as shown below:

Column 12,
Line 2, delete "–H$_2$C$_6$H$_{10}$–" and insert therefor -- –CH$_2$C$_6$H$_{10}$– --.

Signed and Sealed this

Second Day of December, 2003

JAMES E. ROGAN
*Director of the United States Patent and Trademark Office*